US005236514A

United States Patent [19]

Leung et al.

[11] Patent Number: 5,236,514

[45] Date of Patent: Aug. 17, 1993

[54] PURGING COMPOSITION FOR CLEANING THERMOPLASTIC PROCESSING EQUIPMENT

[75] Inventors: Pak S. Leung, Highland Mills; Philbert E. Ramdatt, New York; Roswell E. King, III, Pleasantville, all of N.Y.

[73] Assignee: Union Carbide Chemicals & Plastics Technology Corporation, Danbury, Conn.

[21] Appl. No.: 785,145

[22] Filed: Oct. 29, 1991

Related U.S. Application Data

[63] Continuation of Ser. No. 533,821, Jun. 6, 1990, abandoned.

[51] Int. Cl.[5] ......................... B08B 9/00; C11D 10/00

[52] U.S. Cl. .............................. 134/22.14; 134/22.11; 252/174.23; 252/174.24; 252/129; 252/130; 252/DIG. 2

[58] Field of Search .......................... 134/22.11, 22.14; 252/174.23, 174.24, 129, 130, DIG. 2

[56] References Cited

U.S. PATENT DOCUMENTS 4,731,126 4/1988 Dixit et al. ........................ 134/22.11
4,838,945 6/1989 Fujii et al. .................... 252/DIG. 2

*Primary Examiner*—Asok Pal
*Attorney, Agent, or Firm*—W. F. Gray

[57] ABSTRACT

A purging composition is provided which is useful for cleaning thermoplastic processing equipment. The composition is composed of the following components in the following concentrations:

| Component | Percent by Weight |
|---|---|
| Adsorbate | 0.05 to 5 |
| Matrix resin | 49.5 to 99.5 |
| Abrasive (optional) | 0 to 50 |

The composition can also contain a carrier resin having a melting point different from that of the matrix resin.

18 Claims, No Drawings

PURGING COMPOSITION FOR CLEANING THERMOPLASTIC PROCESSING EQUIPMENT

This application is a continuation of prior U.S. application Ser. No. 07/533,821 filed Jun. 6, 1990 now abandoned.

BACKGROUND OF THE INVENTION

1.) Field of the Invention

This invention relates in general to a purging composition. In one aspect, this invention is directed to a composition useful as a purgant for thermoplastic processing equipment. In another aspect, this invention is directed to a process for removing contaminants from thermoplastic processing equipment by using the purging composition.

2.) Background of the Related Art

In polymer processing, the interface between the surface of the polymer melt and the metal is a very important factor affecting the surface quality of the processed product and the efficiency of processing. Since many surface active additives are used in commercial resins, the interface is easily contaminated.

Tenacious additives such as fluoroelastomers can adsorb on the metal surface itself, and if they remain on the hot metal surface under open air conditions they can degrade and become even more difficult to clean. Particles of degraded material may slough off and contaminate the processed product. Additives remaining in the adsorbed state on the metal surface can also interfere with the performance of other functional additives. Thus, it is important to have an effective purging composition to clean the processing equipment before use in a new application.

There are several commercial purging compounds currently available for use in cleaning thermoplastic processing equipment. However, none of them is very effective, especially when it comes to cleaning tenacious adsorbates like fluoroelastomers. The conventional purging compounds use mechanical approaches by employing either a low melt index (ASTM D-1238) resin or a high loading of filler particles. They may contain a chemical lubricant to ease processing. However, the chemical additives generally have not been designed to enhance competitive adsorption.

In recent years various methods have been employed for purging plastic molding machines. Purging compositions usually contain a lubricant in a thermoplastic resin. Such compositions are useful for purging thermoplastic resins such as, polyolefin resin, vinyl chloride resin, polystyrene resin, peroxide containing resins and various copolymers, polyamides and the like. By using a purging resin which contains a lubricant which is stable, the purging can be effected at a high temperature with a minimum of bubbling, fuming, smelling or degradation of resin properties.

A detergent composition is disclosed in Japanese patent publication No. 54647/1988, and consists of thermoplastic resin, 30–70 weight percent inorganic filler and 1–30 weight percent lubricant. The composition is prepared by melting and kneading the mixture and then forming into pellets. As suitable lubricants the reference mentions liquid paraffin, natural paraffin, microwax, synthetic paraffin, polyethylene wax, higher fatty acid, oxyfatty acid, higher fatty acid amide and the like. The composition is indicated to be useful for removing colored resin remaining in the forming machine as well as burnt or carbonized resin.

Thus, while several purging compositions were available prior to the present invention, none of the commercialy available purging compounds was effective, particularly when it came to cleaning tenacious adsorbates, such as fluoroelastomers. This results in extended down time while the equipment is thoroughly cleaned as well as the possibility of contamination when the processing equipment is used for new applications. Of particular importance, is the cleanliness of processing equipment utilized in pilot plant and research studies of resin systems. In such instances where the effect of small amounts of additives is studied, it is imperative that the processing equipment be free of any possible source of contamination.

Accordingly, one or more of the following objects will be achieved by the practice of the present invention. It is an object of this invention to provide a purging composition useful as a purgant for processing equipment. A further object is to provide a purgant which is particularly useful in removing contaminants from thermoplastic processing equipment. Another object is to provide a purgant composition which is ideally suited for cleaning the die of an extruder used in thermoplastic processing operations. Another object of this invention is to provide a composition comprising an adsorbate, a resin matrix, and optionally an abrasive and/or a carrier resin. A further object is to provide a purging composition which is present in a carrier resin. A still further object is to provide a purging composition which is present in a carrier resin having a melting point different from that of the matrix. A further object of the present invention is to provide a process for the preparation of the purging composition. Another object is to provide a method for cleaning thermoplastic processing equipment using the purging composition of the invention. These and other objects will readily become apparent to those skilled in the art in the light of the teachings herein set forth.

SUMMARY OF THE INVENTION

The present invention is directed to a purging composition useful in cleaning and removing contaminants from porcessing equipment. The purging composition comprises:

(a) at least one metal adsorbate compound, (b) a matrix resin, and optionally, (c) at least one abrasive, and/or (d) a carrier resin having a melting point different from that of the matrix resin.

Additional processing and conditioning aids can also be utilized in the purging composition if desired. The invention also is directed to a process for cleaning contaminants from thermoplastic processing equipment. The process comprises feeding the purging composition into the process equipment and operating the equipment so as to process the composition through the equipment in the same manner as for thermoplastic resins.

The composition of the present invention was found to remove contaminants effectively, even tenaciously adhered fluoroelastomer, from the metal surface. As hereinafter indicated, the purging compositions of this invention effectively remove all but minor traces of fluorinated elastomers.

DESCRIPTION OF THE PREFERRED EMBODIMENTS

As previously indicated, conventional purging compounds use mechanical approaches by employing either a low melt index "abrasive" resin and or a high loading of filler particles. They may also use chemical lubricants to ease processing. In contrast to the prior art, the present invention uses both mechanical and chemical cleaning. A weak metal adsorbate at sufficient concentration can effectively remove contaminants that, after cleaning, can easily be displaced so that it would not itself become a contaminant. The weak adsorbate employed is also preferably not soluble to any degree, or at most only partially soluble in the matrix resin and melts at or just below the temperature at the location most needing the cleaning. Additionally, processing aids such as UCARSIL PA-1 Processing Aid may be present in the composition to serve as conditioning agents on the relatively clean surface generated during purging. Accordingly the in situ conditioning procedure during purging is both effective and time saving. Thus, the specially formulated purging composition is able to work much better than conventional compounds currently used.

The purging composition of the present invention can therefore clean even very tenacious adsorbates like fluoroelastomers, which most of the existing purging compounds can not clean effectively. As hereinafter indicated in the examples, effectiveness in removing fluoroelastomers was measured by analysis for fluorine remaining on the metal surfaces within the processing equipment. Commercially available purging compositions were not as effective in removing the fluorine-containing elastomers as were the compositions of the invention.

As indicated above, the purging composition of the present invention comprises at least one adsorbate, a resin matrix and optionally an abrasive. If desired, these components can also be further compounded into a carrier resin having a melting point higher or lower than that of the resin matrix.

As indicated, the purging composition of the present invention contains at least one metal adsorbate, preferably a metal adsorbate such as sodium or potassium stearate. While a variety of adsorbates can be employed, their use is subject to their compatibility with other components and processing conditions utilized in the preparation and use of the purgant.

Illustrative adsorbates include, but are not limited to compounds such as, sodium stearate, potassium stearate, zinc stearate, calcium stearate, potassium laurate, phosphate esters, e.g., poly(oxy-1,2-ethanediyl), alpha-(nonylphenyl)-omega-hydroxyphosphate sold by the GAF Corp. as GAFAC RE 610 and the like. Sodium and potassium stearates are particularly preferred since they are nearly insoluble and have melting points near the die temperature when processing polyethylene.

In practice it has been found that the optimum results are achieved if the adsorbate is contained in a matrix resin which serves to evenly disperse these components so that uniform exposure can be obtained to the surfaces desired to be cleaned. In general, it has been observed that a variety of resins can be employed as the matrix resin. The preferred resins are those polymeric compounds having good thermal stability and a low melt index, preferably from about 0.3 to about 5. Illustrative resins include, but are not limited to polyolefins such as polyethylene, polypropylene, polystyrene, ABS resins, polyamide, polyester, polycarbonate resins, and the like.

In some instances it may be desirable to include an abrasive in the purging composition. In practice, a wide variety of abrasives can be used in the purging compositions of this invention. The choice of a particular abrasive will depend in part on the type of metal or other surfaces of which the equipment is made, the compatibility with the other components of the purging composition, and the like.

Illustrative abrasives that can be utilized in the purging compositions of the present invention include, but are not limited to: diatomaceous earth, e.g. Super Floss, (a product of the Manville Corp.) ceramic particles, e.g., Zeeosphere (from Zeelan Industries, Inc.), aluminum oxide, calcium carbonate, titanium dioxide, silica, minerals such as koalin, mica, Wollastonite, and the like.

In addition to the metal adsorbate, matrix resin and abrasive (if employed), in some instances it may be desirable to mix the aforesaid components with a carrier resin. The carrier resin, if used, will preferably have a different melting point than that of the matrix resin. Depending upon the particular processing equipment being cleaned, the melting point of the carrier resin may be higher or lower than the matrix resin. The difference between the melting point of the matrix and carrier resin can range from about 5° to about 50° C.

A suitable carrier resins may be a single resin or mixture of resins, such as those enumerated above for the matrix resin, and it is preferred that it has a different composition than the matrix resin and therefore has a different melting point.

As previously indicated, it may be desirable to include one or more other additives in the purging composition depending upon the particular applications. Such additives can include one or more antioxidants, such as octadecyl 3,5-di-tert-butyl-4-hydroxyhydrocinnamate, tris(2,4-tert-butylphenyl)phosphite, tris(4-tert-butyl-3-hydroxy-2,6-dimethylbenzyl)-5-triazine-2,4,6-(1H, 3,5H)trione, 1,3,5-trimethyl-2,4,6-tris(3,5-di-tert-butyl-4-hydroxybenzyl)benzene, tetrakis(methylene (3,5-di-tert-butyl-4-hydroxyhydrocinnamate)) methane, and the like.

In addition to antioxidants, other additives may also be present in the purging composition of this invention. For example, the composition may contain surfactants, processing aids, lubricants such as silicones, glycol monostearate esters, and the like.

In practice, it has been found that optimum results are obtained when the purging composition contains the aforementioned components in the following concentrations:

| Component | Percent by Weight |
|---|---|
| Adsorbate | 0.05 to 5 |
| Matrix resin | 45 to 99 |
| Abrasive (optional) | 0 to 50 |

Concentrations above and below these ranges may also be employed but are less preferred. Particularly preferred are compositions wherein the adsorbate is present in an amount of from about 0.1 to about 1.0 percent and the abrasive, if used, is present in an amount of from aout 2 to about 20 weight percent. Variations in the particular formulations will of course be dependent upon a variety of factors readily recognized by one skilled in the art.

Depending upon the particular conditions, it may be desirable to prepare a master batch containing the metal adsorbate additives and optionally an abrasive in a carrier resin. A small amount of this master batch when needed, can be mixed with the purging matrix resin. The purging matrx resin may or may not also contain additional abrasive.

A purging composition master batch can be made by mixing 5% of a weak metal adsorbate, such as potassium stearate, 10% abrasive filler, such as diatomaceous earth, 5% conditioning processing aid, such as UCARSIL PA-1 Processing Aid (tradename for a processing agent marketed by Union Carbide Chemicals & Plastics Company, Inc., and comprising a polydimethylsiloxane with pendant polyether groups) in a resin having a higher melting point than the bulk of the resin used for purging. Suitable higher melting carrier resins include polypropylene and the like when used in polyethylene as matrix. The mixture is then extruded and pelleted. Two percent of this master batch is mixed with a purging matrix resin containing about 90% resin (e.g. linear low density polyethylene) and about 10% abrasive filler. The ratio of the master batch to the matrix resin can be increased for higher effectiveness. A higher melting resin is used for the master batch carrier so as to deliver the master batch to the die region which is the the critical area. For cleaning the screw or barrel near the feed section, a lower melting resin can be used. Potassium stearate is the preferred adsorbate because of its relative insolubility in polyolefin and its melting point close to the die temperature usually chosen for extruding polyethylene. Other weak adsorbates with corresponding properties can be used in other systems. The matrix resin used can be chosen to possess desirable rheological properties. Low melt index resins are frequently used because of their abrasiveness and the advantage that after purging, the resin can be peeled out from the screw and barrel.

It has been found that a particularly desirable purge composition can be formulated having the following composition of components:

2% pellets containing
- 5% UCARSIL PA-1 Processing Aid
- 5% potassium stearate
- 10% Super Floss diatomaceous earth
- 80% polypropylene Himont 6801

98% pellets containing
- 10% Super Floss
- 90% linear low density polyethylene 1 melt index The composition can also contain antioxidants as well as other additives customarily used in purging formulations. After this formulation was used to clean equipment in which fluoroelastomers had been processed, no fluorine was detected on steel inserts placed in the die.

The following example is illustrative:

EXAMPLE 1

A Brabender extruder with a ¾" screw was used for the evaluation. The extruder was fitted wih a tape die having a removable mild steel shim insert serving as one surface of the die. The final die gap was about 0.04 inch. A composition of 1 melt index linear low density polyethylene containing 0.09% Viton A fluoroelastomer was extruded for one hour at 200° C. and 80 RPM. Viton A is a very tenaciously adsorbed elastomer. It was used as a model contaminant to be purged out to determine the effectiveness of the purging composition. The extruder was then purged with the purging compositions listed below for 30 minutes at 200° C. The steel die insert was then studied by ESCA (electron spectroscopy for chemical analysis) to determine fluorine atom concentration remaining after purging.

| Purging Compound | Percent Fluorine |
|---|---|
| Linear low density polyethylene 1 melt index (LLDPE) | 15.2 |
| Z-Clean* | 9.6 |
| LLDPE/0.1% zinc stearate (ZnSt)/ 0.5% Super Floss (SF) | 6.1 |
| LLDPE/0.1% stearic acid/0.5% SF | 5.8 |
| LLDPE/0.1% sodium stearate/0.5% SF | 1.8 |
| LLDPE/0.1% sodium stearate/0.5% SF (purged at 210° C.) | 0.4 |
| LLDPE/0.1% potassium stearate/0.5% SF | 0 |
| LLDPE/0.1% sodium carbonate/0.5% SF | 18.7 |
| LLDPE/5% MB1** | 2.9 |
| LLDPE/5% MB2*** | 0.7 |
| LLDPE/10% SF | 0.7 |
| LLDPE/0.25%P A-1, 0.25% Gafac RB 610 (a phosphate ester) | 0.7 |

*A purging composition marketed by Chisso Corp.
**A master batch 1 containing 90% LLDPE of two melt index, 5% PA-1 and 5% Super Floss.
***A master batch 2 containing 90% polypropylene Himont 6801, 5% PA-1, and 5% Super Floss.

It is noted from the above data, that sodium stearate, potassium stearate and the phosphate ester are very effective as evidenced from the small fluorine atom concentration on the die surface.

EXAMPLE 2

Sticky polymer FR compound (a fire retardant polyolefin composition supplied by Union Carbide) was processed using a two roll mill and a size B Banbury Mixer, Afterwards both pieces of equipment were cleaned with a purge composition comprising one part of the first component and two parts of the second component as follows:

first component:
- 80% polypropylene (Himont 6801)
- 10% Super Floss
- 5% potassium stearate
- 5% PA-1 second component:
- 90% Polyethylene
- 10% Super (loss

The results indicated that the cleaning was unusually easy as compared to using commercially available purging compounds.

Although the invention has been illustrated by the preceding examples it is not to be construed as being limited to the materials employed therein, but rather, the invention relates to the generic area as hereinbefore disclosed. Various modifications and embodiments thereof can be made without departing from the spirit or scope thereof.

What is claimed is:

1. A purging composition useful for cleaning equipment for processing thermoplastic resins, said composition consisting essentially of:

(a) a matrix resin;

(b) at least one metal adsorbate compound selected from the group consisting of phosphate esters, and metal salts of carboxylic acids; said metal adsorbate compound being at most only partially soluble in said matrix resin; and (c) at least one abrasive.

2. The composition of claim 1 wherein said matrix resin is selected from the group consisting of polyolefins, polystyrene, ABS resins, polyamides, polyester resins, and polycarbonate resins.

3. The composition of claim 1 wherein said matrix resin is present in said composition in an amount of from about 49.5 to about 99.5 percent by weight.

4. The composition of claim 1 wherein said metal adsorbate compound is selected from the group consisting of the sodium, potassium, calcium, and zinc salts of fatty acids.

5. The composition of claim 1 wherein said metal adsorbate compound is present in said composition in an amount of from about 0.05 to about 5 percent by weight.

6. The composition of claim 1 wherein said abrasive compound is selected from the group consisting of diatomaceous earth, ceramic particles, aluminum oxide, calcium carbonate, titanium dioxide, silica, kaolin, mica, and wollastonite.

7. The composition of claim 1 wherein said abrasive compound is present in said composition in an amount of from about 0.5 to about 50 percent by weight.

8. A purging composition useful for cleaning equipment for processing thermoplastic resins, said composition consisting essentially of:

(a) a matrix resin;

(b) at least one metal adsorbate compound selected from the group consisting of phosphate esters, and metal salts of carboxylic acids; said metal adsorbate compound being at most only partially soluble in said matrix resin;

(c) at least one abrasive; and (d) a carrier resin having a melting point different from that of said matrix resin.

9. The composition of claim 8 wherein said matrix resin is selected from the group consisting of polyolefins, polystyrene, ABS resins, polyamides, polyester resins, and polycarbonate resins.

10. The composition of claim 8 wherein said matrix resin is present in said composition in an amount of from about 49.5 to about 99.5 percent by weight.

11. The composition of claim 8 wherein said metal adsorbate compound is selected from the group consisting of the sodium, potassium, calcium, and zinc salts of fatty acids.

12. The composition of claim 8 wherein said metal adsorbate compound is present in said composition in an amount of from about 0.05 to about 5 percent by weight.

13. The composition of claim 8 wherein said abrasive compound is selected from the group consisting of diatomaceous earth, ceramic particles, aluminum oxide, calcium carbonate, titanium dioxide, silica, kaolin, mica, and wollastonite.

14. The composition of claim 8 wherein said abrasive compound is present in said composition in an amount of from about 0.5 to about 50 percent by weight.

15. The composition of claim 8 wherein said carrier resin is selected from the group consisting of polyolefins, polystyrene, ABS resins, polyamides, polyester resins, and polycarbonate resins.

16. The composition of claim 8 wherein said carrier resin is present in said composition in an amount of 50% by weight or less.

17. A method for cleaning equipment used in processing thermoplastic resins, comprising the steps of feeding into said equipment a purging composision consisting essentially of:

(a) a matrix resin;

(b) at least one metal adsorbate compound selected from the group consisting of phosphate esters, and metal salts of carboxylic acids; said metal adsorbate compound being at most only partially soluble in said matrix resin; and (c) at least one abrasive, and operating said equipment so as to process said composition through said equipment in the same manner as for thermoplastic resins.

18. A method for cleaning equipment used in processing thermoplastic resins, comprising the steps of feeding into said equipment a purging composision consisting essentially of (a) a matrix resin;

(b) at least one metal adsorbate compound selected from the group consisting of phosphate esters, and metal salts of carboxylic acids; said metal adsorbate compound being at most only partially soluble in said matrix resin;

(c) at least one abrasive; and (d) a carrier resin having a melting point different from that of said matrix resin, and operating said equipment so as to process said composition through said equipment in the same manner as for thermoplastic resins.

* * * * *